(12) United States Patent
Katz et al.

(10) Patent No.: US 6,189,061 B1
(45) Date of Patent: Feb. 13, 2001

(54) MULTI-MASTER BUS SYSTEM PERFORMING ATOMIC TRANSACTIONS AND METHOD OF OPERATING SAME

(75) Inventors: Itai Katz, Netanya; Moti Kurnick, Tel-Aviv; Noam Halevi, Beer Sheva; Vladislav Kopzon, Haifa, all of (IL)

(73) Assignee: Motorola, Inc., Schaumburg, IL (US)

( * ) Notice: Under 35 U.S.C. 154(b), the term of this patent shall be extended for 0 days.

(21) Appl. No.: 09/241,161

(22) Filed: Feb. 1, 1999

(51) Int. Cl.[7] .............................. G06F 9/48; G06F 13/14; G06F 13/16
(52) U.S. Cl. .......................... 710/110; 710/107; 709/101
(58) Field of Search .............................. 710/113, 107, 710/22, 23, 28, 110, 240, 241, 36, 260; 709/100, 101, 208; 711/100; 714/3

(56) References Cited

U.S. PATENT DOCUMENTS

| | | |
|---|---|---|
| 5,249,297 | * 9/1993 | Brockmann et al. . |
| 5,446,862 | * 8/1995 | Ohkami . |
| 5,519,838 | * 5/1996 | Ziegler et al. . |
| 5,581,713 | * 12/1996 | Myers et al. . |
| 5,752,081 | * 5/1998 | Jirgal . |
| 5,930,822 | * 7/1999 | Chaney et al. . |
| 6,012,116 | * 1/2000 | Aybay et al. . |

FOREIGN PATENT DOCUMENTS

| | | | |
|---|---|---|---|
| 0 737 924 | 10/1996 | (EP) | ............................. G06F/13/362 |
| 0 798 894 | 10/1997 | (EP) | ............................. H04L/12/24 |
| 2 313 986 | 12/1997 | (GB) | ............................. G06F/13/362 |
| 8-339346 | 12/1996 | (JP) | ............................. G06F/13/362 |
| WO 96/41271 | 12/1996 | (WO) | ............................. G06F/13/364 |

* cited by examiner

Primary Examiner—Gopal C. Ray

(57) ABSTRACT

A multi-master bus system (10) comprises bus (12), a plurality of bus devices (14, 16, 18, 20, 22, 24), coupled to the bus, including masters (14, 16, 18), and slaves (20, 22, 24), a memory controller (26) for controlling the data exchange on bus (12), having a memory (36) for storing a transaction type value with respect to each slave (20, 22, 24). The multi-master bus system (10) comprises further an arbiter (30) for performing bus arbitration, arbiter (30) having logic for conditionally subsequently granting the bus (12) to a master of an initiating transaction for a closing transaction depending on the transaction type value of the slave of the initiating transaction. The multi-master bus system makes atomic or indivisible transactions possible on a bus without changing the bus width or the bus protocol.

17 Claims, 1 Drawing Sheet

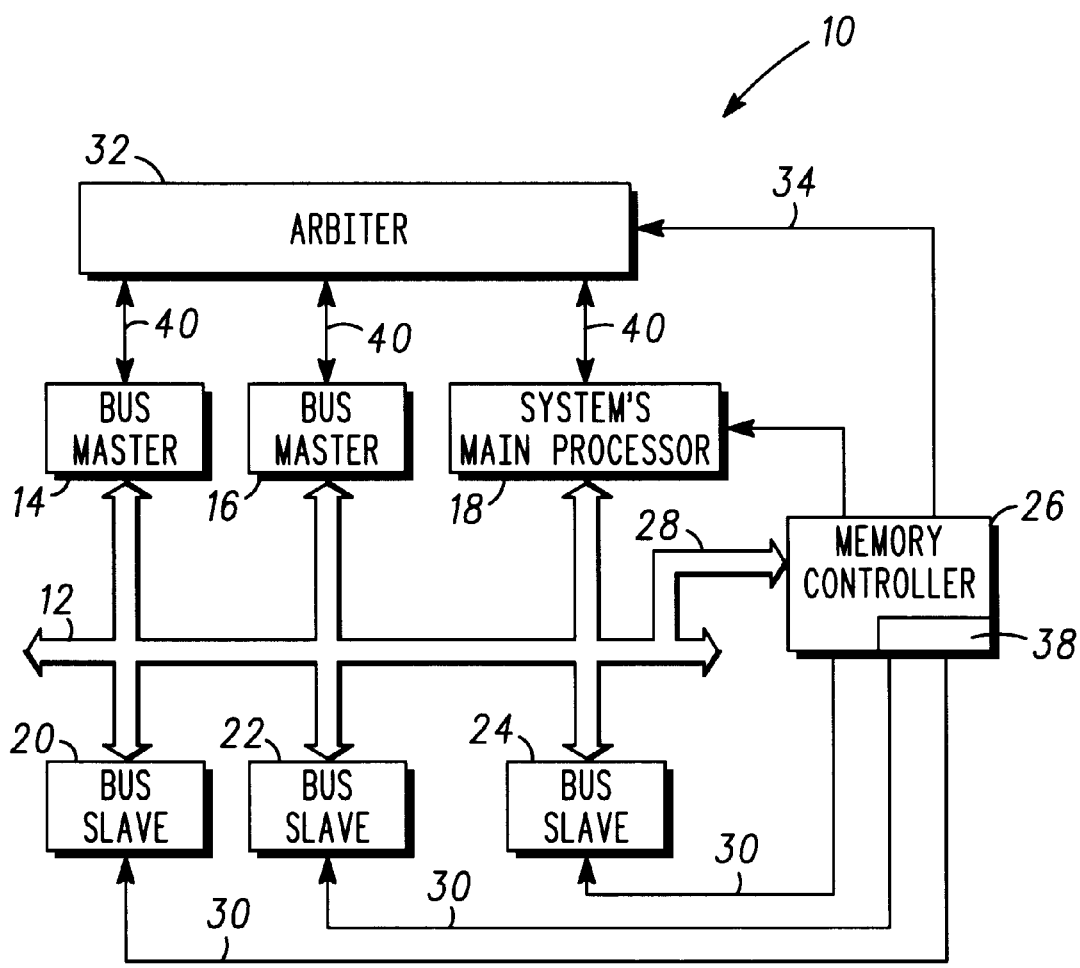

MULTI-MASTER BUS SYSTEM PERFORMING ATOMIC TRANSACTIONS AND METHOD OF OPERATING SAME

FIELD OF THE INVENTION

The present invention relates to the atomic transfer of data on a bus.

BACKGROUND OF THE INVENTION

In the electronic arts it is often desired to perform data exchange between different devices. These data can be information to be processed further by the receiving device or control signals controlling the receiving device. The several devices are connected by a bus which allows data transfer from one sending device to typically one receiving device at a time. Master devices are authorized to demand bus access in order to initiate such a data transfer, slave devices can not initiate a transfer. Several masters can demand bus access simultaneously and arbitrate for the bus. An arbiter grants the bus to the master who wins the arbitration.

In typical bus systems, at least one slave is a memory. A memory often needs to reply in an indivisible access to one or more subsequent bus transactions with the same bus master. Such bus transactions are called "atomic" and include "read after write" or "write after read". Here, "read after write" includes several successive reads followed by a final write and "write after read" includes several successive writes followed by a final read. Some buses support atomicity, e.g. the VME bus has a special signal line to "lock" the bus for atomic transactions and prevent access by other masters. But in these cases the bus including the protocol must be constructed to allow atomic transactions.

Write after read as well as read after write transactions are necessary in a Content Associative Memory (CAM). It is desirable to connect CAM to an existing system without having to modify the bus or the bus protocol.

There is a need for making atomic transactions possible on a bus without changing the bus width or the bus protocol.

BRIEF DESCRIPTION OF THE DRAWINGS

FIG. 1 is a simplified schematic diagram of a multi-master bus system according to the present invention.

DETAILED DESCRIPTION OF THE PREFERRED EMBODIMENT

FIG. 1 shows multi-master bus system 10 comprising bus 12 having address lines, data lines and control lines (not shown). A plurality of bus devices 14, 16, 18, 20, 22, 24 is coupled to bus 12, namely masters 14, 16, 18 and slaves 20, 22, 24. Memory controller 26 is coupled to address and control lines 28 of bus 12, additionally to the slaves 20, 22, 24, which are memory devices, via memory control lines 30. Furthermore, memory controller 26 is coupled to arbiter 32 by atomic request line 34 and again to master 18, which is the system's main processor, by interrupt line 36. Memory controller 26 has memory 38 organized in banks for storing a transaction type value with respect to each slave 20, 22, 24. Each memory bank contains information of a respective slave. Arbiter 32 is coupled to bus masters 14, 16, 18, by arbitration lines 40, arbiter 32 having logic for granting the bus to one of the masters at a time.

Multi-master bus system 10 provides for atomic transactions, i.e. indivisible access to bus 12 for one or more subsequent bus transactions with the same bus master. Such atomic transactions are necessary if certain slaves, e.g. CAM, are accessed. Thus, for each of slaves 20, 22, 24 a transaction type is defined and which is encoded in transaction type values two bits wide which are stored in the respective bank of memory 38 of memory controller 26. The following table shows transaction types with respect to related transaction type values.

| Transaction Type | Transaction Type Value |
| --- | --- |
| Normal operation | 00 |
| Read after write atomicity | 01 |
| Write after read atomicity | 10 |
| Reserved | 11 |

Three transaction type values are defined for the three types of transactions normal operation, read after write atomicity, and write after read atomicity. In this example, no slave needs read after write atomicity and also write after read atomicity, thus the fourth transaction type value is not related to such a transaction type but is reserved.

Multi-master bus system 10 works as follows. Usually, several masters have to perform data transfer tasks at the same time. Therefore, such masters 14, 16, 18 compete for the bus by sending bus request signals to arbiter 32 on arbitration lines 40. Arbiter 32 has logic for granting the bus to a master who wins the arbitration according to an arbitration scheme which considers a hierarchical order of the masters. This master becomes the actual bus master who has sole access to bus 12 for a defined number of bus clock cycles.

Memory controller 26 controls the data transfer on the bus as follows. Bus 12 is granted to an actual bus master, one of the masters 14, 16, 18. This actual bus master provides address and address attribute signals on bus 12 specifying an actual data transaction to be performed. Memory controller 26 reads these address and address attribute signals, identifies the address and associates one of the memory devices, slaves 20, 22, 24, as an actual slave, with which the respective data is to be transferred, and whether the actual data transaction is a read or a write. Then, memory controller 26 provides memory control signals on memory control lines 30 in order to perform the desired data transfer. Thereby, memory controller 26 takes care of the correct timing of any bus actions of the actual slave.

Additionally, memory controller 26 compares the actual data transaction with the transaction type of the actual slave, using the transaction type values stored in the banks of its memory 38. If the transaction type of the actual slave is normal operation, or is the closing or finalizing transaction of an atomic transaction, then memory controller 26 provides a signal encoding "no atomic request", e.g. "low" on atomic request line 34. If the transaction type of the actual slave is the initiating or beginning transaction of an atomic transaction, then memory controller 26 provides a signal encoding "atomic request", e.g. "high" on atomic request line 34.

Bus 12 is granted to the actual bus master only for one initiating bus transaction, i.e. for a defined number of bus clock cycles. The actual bus master becomes a normal bus master with respect to an arbitration for a next bus transaction. The arbitration for a next bus transaction happens during the initiating bus transaction such that it is complete before the next bus transaction and the bus is used efficiently.

In the case of normal operation, which is indicated by the signal encoding "no atomic request", e.g. "low" on atomic request line 34, arbiter 32 receives bus request signals from masters, e.g. 14, 16, 18 competing for bus 12 for the next bus transaction. Arbiter 32 grants the bus to a master who wins the arbitration according to an arbitration scheme which considers a normal hierarchical order of the masters. This master becomes the actual bus master who has sole access to bus 12 for a defined number of bus clock cycles.

In the case of an atomic operation, which is indicated by the signal encoding "atomic request", e.g. "high" on atomic request line 34, arbiter 32 receives bus request signals from masters, e.g. 14, 16, 18, at least including the master of the initiating transaction, competing for bus 12 for the next bus transaction. Arbiter 32 grants the bus to the master of the initiating transaction who becomes/stays the actual bus master and has sole access to bus 12 for a defined number of bus clock cycles.

Thus, multi-master bus system 10 comprises bus 12, a plurality of bus devices 14, 16, 18, 20, 22, 24, coupled to the bus, including masters 14, 16, 18 having logic for requesting bus 12 and for initiating an initiating transaction upon being granted the bus, and slaves 20, 22, 24, memory controller 26 coupled to bus 12 for controlling the data exchange between bus devices 14, 16, 18, 20, 22, 24, memory controller 26 having memory 36 for storing a transaction type value with respect to each slave 20, 22, 24. Multi-master bus system 10 comprises further arbiter 30 coupled to bus masters 14, 16, 18 and memory controller 26 for performing bus arbitration, arbiter 30 having logic for conditionally subsequently granting bus 12 to the master of the initiating transaction for a closing transaction depending on the transaction type value of the slave of the initiating transaction.

Multi-master bus system 10 makes atomic transactions possible on a bus without changing the bus width or the bus protocol. Thus, well known bus systems can be used in new electronics designs which can include memory devices that need atomic transactions.

Granting the bus to the master of the initiating transaction by arbiter 32 can be achieved in several ways. A preferred possibility according to the invention is that the bus request signals from all other masters, e.g. 14, 16, 18, than the actual bus master are masked. Thus, only the actual bus master enters the arbitration process and thus wins bus 12 for a subsequent bus transaction.

Another preferred possibility according to the invention is that the actual bus master is given a higher hierarchical order than all other masters just for the current arbitration process. Thus, the actual bus master wins bus 12 for a subsequent bus transaction.

Still another preferred possibility according to the invention is that the arbitration process is blocked and the result of the previous arbitration process is repeated. Thus, the actual bus master is granted the bus 12 for a subsequent bus transaction.

Preferably, memory controller 26 removes the signal encoding "atomic requests" e.g. "high" from atomic request line 34 after a predefined time has elapsed, and sends an interrupt signal to system's main processor 18 via interrupt line 32. This prevents that bus 12 hangs because of an uncompleted atomic transaction.

Advantageously, the transaction type value with respect to a slave is changeable. This allows an application specific use of slaves 20, 22, 24.

A method of operating bus 12 comprises the steps of defining a transaction type with respect to each slave 20, 22, 24;
arbitrating of bus 12 by arbiter 30;
granting bus 12 to an initiating master if the initiating master wins the arbitration;
performing an initiating transaction by the initiating master on bus 12;
if the transaction type is of a predetermined type,
granting bus 12 subsequently to the initiating master for performing a closing transaction by the initiating master on bus 12.

The transaction type and therefore the associated atomicity is determined by each slave 20, 22, 24 and thus defined with respect to each slave. During the operation of bus 12, arbitrating of bus 12 is performed by arbiter 30, which grants bus 12 to an initiating master who wins the arbitration. The initiating master performs an initiating transaction on bus 12. Now, if the transaction type is of a predetermined type, i.e. an atomic transaction, bus 12 is granted subsequently to the initiating master for performing a closing transaction by the initiating master on bus 12.

Preferably, the method comprises, when the transaction type is of the predetermined type, the step
masking bus request signals from other masters than the initiating master at least until bus 12 is granted to the initiating master for the closing transaction.

Preferably, the method comprises, when the transaction type is of the predetermined type, the step
increasing a priority of the initiating master while arbiting the bus for the closing transaction.

Preferably, the method comprises, when the transaction type is of the predetermined type, the step
blocking the arbitration process and repeating the result of the previous arbitration process at least until the bus is granted to the initiating master for the closing transaction.

Preferably the transaction type of each slave is stored in a memory, which is advantageously within memory controller 26.

Preferably, the method comprises, when the transaction type is of the predetermined type, the step
releasing the bus and sending an interrupt signal to a processor after elapsing of a predetermined time.

Those of skill in the art will understand based on the description herein that the invention is applicable with respect to semaphores. Those of skill in the art will know that the invention is also applicable to buses whereon addresses and data are multiplexed.

It is not the typical application but still within the scope of this invention, that devices can act as master or slave for different transactions, thus being a master acting as a slave, when involved in a transaction initiated by another master.

In the foregoing detailed description of the preferred embodiment, reference is made to the accompanying drawing which forms a part hereof, and in which is shown by way of illustration specific embodiments in which the invention can be practiced. These embodiments have been described in sufficient detail to enable those skilled in the art to practice the invention, and it is to be understood that other embodiments can be utilized and that logical, mechanical and electrical changes can be made without departing from the spirit and scope of the present invention. The foregoing detailed description is, therefore, not to be taken in a limiting sense, and the scope of the present inventions is defined only by the appended claims.

What is claimed is:
1. A multi-master bus system comprising
a bus;
a plurality of bus devices coupled to the bus, including masters having logic for requesting the bus for an atomic transaction, and slaves;
a memory controller coupled to the bus for controlling the data exchange between the bus devices, the memory controller having memory for storing a transaction type value with respect to each slave; and an arbiter coupled to the bus masters and to the memory controller for performing bus arbitration, the arbiter having logic for conditionally subsequently granting the bus to a master for performing an atomic transaction if the transaction type value of the slave is of a predefined value;

wherein the arbiter comprises logic for masking bus request signals from other masters not involved in the atomic transaction until the arbitration for the transaction subsequent to the atomic transaction.

2. A multi-master bus system comprising a bus;

a plurality of bus devices coupled to the bus, including masters having logic for requesting the bus for an atomic transaction, and slaves;

a memory controller coupled to the bus for controlling the data exchange between the bus devices, the memory controller having memory for storing a transaction type value with respect to each slave; and an arbiter coupled to the bus masters and to the memory controller for performing bus arbitration, the arbiter having logic for conditionally subsequently granting the bus to a master for performing an atomic transaction if the transaction type value of the slave is of a predefined value;

wherein the arbiter comprises logic for increasing a priority of the master of the atomic transaction due to a signal from the memory controller until the arbitration for the transaction subsequent to the atomic transaction.

3. A multi-master bus system comprising a bus;

a plurality of bus devices coupled to the bus, including masters having logic for requesting the bus for an atomic transaction, and slaves;

a memory controller coupled to the bus for controlling the data exchange between the bus devices, the memory controller having memory for storing a transaction type value with respect to each slave; and an arbiter coupled to the bus masters and to the memory controller for performing bus arbitration, the arbiter having logic for conditionally subsequently granting the bus to a master for performing an atomic transaction if the transaction type value of the slave is of a predefined value;

wherein the arbiter comprises logic for blocking the arbitration process and repeating the result of the previous arbitration process.

4. The multi-master bus system of claim 3, wherein the bus is granted to the master of the atomic transaction at least for a predefined number of bus cycles.

5. The multi-master bus system of claim 3, wherein the bus is granted to the master of the atomic transaction at most until elapsing of a predetermined time.

6. The multi-master bus system of claim 3, wherein the transaction type value with respect to a slave is changeable.

7. The multi-master bus system of claim 3, wherein a possible transaction type is "read after write".

8. The multi-master bus system of claim 3, wherein a possible transaction type is "write after read".

9. A method of operating a bus, the method comprising the steps of:

defining a transaction type with respect to each slave;

arbitrating of the bus by an arbiter;

granting the bus to the master who wins the arbitration;

performing an initiating transaction by the initiating master on the bus; and if the transaction type is of a predetermined type, granting the bus subsequently to the initiating master for performing a closing transaction by the initiating master on the bus; and when the transaction type is of the predetermined type, masking bus request signals from other masters than the initiating master at least until the bus is granted to the initiating master for the closing transaction.

10. A method of operating a bus, the method comprising the steps of:

defining a transaction type with respect to each slave;

arbitrating of the bus by an arbiter;

granting the bus to the master who wins the arbitration;

performing an initiating transaction by the initiating master on the bus; and if the transaction type is of a predetermined type, granting the bus subsequently to the initiating master for performing a closing transaction by the initiating master on the bus; and when the transaction type is of the predetermined type, increasing a priority of the initiating master while arbiting the bus for the closing transaction.

11. A method of operating a bus, the method comprising the steps of:

defining a transaction type with respect to each slave;

arbitrating of the bus by an arbiter;

granting the bus to the masters who wins the arbitration;

performing an initiating transaction by the initiating master on the bus; and if the transaction type is of a predetermined type, granting the bus subsequently to the initiating master for performing a closing transaction by the initiating master on the bus; and when the transaction type is of the predetermined type, blocking the arbitration process and repeating the result of the previous arbitration process at least until the bus is granted to the initiating master for the closing transaction.

12. A method of operating a bus, the method comprising the steps of:

defining a transaction type with respect each slave;

arbitrating of the bus by an arbiter;

granting the bus to the master who wins the arbitration;

performing an initiating transaction by the initiating master on the bus; and if the transaction type is of a predetermined type, granting the bus subsequently to the initiating master for performing a closing transaction by the initiating master on the bus; and wherein the bus is granted to the master of the initiating transaction for a closing transaction due to a signal from the memory controller.

13. The method of claim 12, comprising the step of storing the transaction type of each slave in a memory.

14. The method of claim 13, wherein the memory is within the memory controller.

15. The method of claim 12, comprising, when the transaction type is of the predetermined type, the additional step releasing the bus and sending an interrupt signal to a processor after elapsing of a predetermined time.

16. The method of claim 12, wherein a possible transaction type is "read after write".

17. The method of claim 12, wherein a possible transaction type is "write after read".

* * * * *